US012649166B2

(12) United States Patent
Kawabe et al.

(10) Patent No.: US 12,649,166 B2
(45) Date of Patent: Jun. 9, 2026

(54) COATING NOZZLE

(71) Applicant: Honda Motor Co., Ltd., Tokyo (JP)

(72) Inventors: Gaku Kawabe, Tokyo (JP); Naoki Eto, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 452 days.

(21) Appl. No.: 18/358,947

(22) Filed: Jul. 26, 2023

(65) Prior Publication Data

US 2024/0123464 A1 Apr. 18, 2024

(30) Foreign Application Priority Data

Oct. 17, 2022 (CN) ......................... 202211266486.4

(51) Int. Cl.
*B05B 1/14* (2006.01)
*B05B 12/08* (2006.01)
*B05C 5/02* (2006.01)

(52) U.S. Cl.
CPC .................................... *B05C 5/027* (2013.01)

(58) Field of Classification Search
None
See application file for complete search history.

(56) References Cited

U.S. PATENT DOCUMENTS 4,384,737 A * 5/1983 Reusser ................ F16L 15/004 285/369
2017/0225179 A1* 8/2017 Kawabe .................... B05B 1/14
2021/0245190 A1* 8/2021 Kikuchi ................ B05B 7/1263

FOREIGN PATENT DOCUMENTS

JP 6321695 5/2018
JP 6496330 4/2019

* cited by examiner

*Primary Examiner* — Alexander M Weddle
(74) *Attorney, Agent, or Firm* — JCIPRNET

(57) ABSTRACT

A coating nozzle is provided. The coating nozzle includes: a chamber portion, communicated with a coating material supply portion; a supply surface, disposed on a side of the chamber portion; a discharge surface, disposed on other side of the chamber portion opposite to the supply surface and used to discharge the coating material; supply holes, annularly arranged on the supply surface with a first position as a center; discharge holes, arranged into at least one straight line on the discharge surface; and communication hole paths, respectively and correspondingly communicated from the supply holes on the supply surface to the discharge holes on the discharge surface. The communicating holes respectively have different lengths. The communication hole paths include a large diameter portion and a small diameter portion whose diameter is shorter that of the large diameter portion. The small diameter portions respectively have different diameters or lengths.

10 Claims, 2 Drawing Sheets

COATING NOZZLE

CROSS-REFERENCE TO RELATED APPLICATION

This application claims the priority benefit of China application serial no. 202211266486.4, filed on Oct. 17, 2022. The entirety of the above-mentioned patent application is hereby incorporated by reference herein and made a part of this specification.

BACKGROUND

Technical Field

The disclosure relates to a coating nozzle.

Description of Related Art

In recent years, efforts have been devoted to the development of research and technology related to recycling in order to prevent the generation of waste and the reduction of waste, recycle and reuse, etc.

In the past, a coating nozzle for coating a coating material to a vehicle body is proposed and has multiple supply holes and multiple discharge holes. The supply holes are annularly arranged and the discharge holes are linearly arranged (Japanese Patent No. 6321695). In recent years, in order for the material coated by the coating nozzle to be more uniform, attempts have been made to reduce the gap between the discharge holes, so as to achieve even coating. However, if the gap is reduced, the length of the communication hole path connecting the supply hole and the discharge hole changes, such that the pressure loss of the communication hole path is uneven, and the thickness of the coating material also becomes uneven. When the gap is reduced to a certain extent, the interference of the communication hole path occurs, and there is an issue of machining to reduce the aperture in order to prevent the interference of the communication hole paths.

In order to solve the above issues, the disclosure provides a coating nozzle, which can enable the film thickness of the coating material to be even. Furthermore, waste of the coating material can be prevented, which facilitates a significant reduction in the generation of waste.

SUMMARY

The coating nozzle of the disclosure, for coating a coating material supplied from a coating material supply portion on a coating object includes: a chamber portion, communicated with the coating material supply portion; a supply surface, disposed on a side of the chamber portion; a discharge surface, disposed on other side of the chamber portion opposite to the supply surface and used to discharge the coating material; multiple supply holes, annularly arranged on the supply surface with a first position as a center; multiple discharge holes, linearly arranged into at least one straight line on the discharge surface, wherein a number of the discharge holes corresponds to a number of the supply holes; and multiple communication hole paths, respectively and correspondingly communicated from the supply holes on the supply surface to the discharge holes on the discharge surface, wherein the communicating holes respectively have different lengths, the communicating holes include a large diameter portion and a small diameter portion whose diameter is shorter than a diameter of the large diameter portion, the small diameter portions in the communicating holes respectively have different diameters or lengths.

DESCRIPTION OF THE EMBODIMENTS

Figure 1:
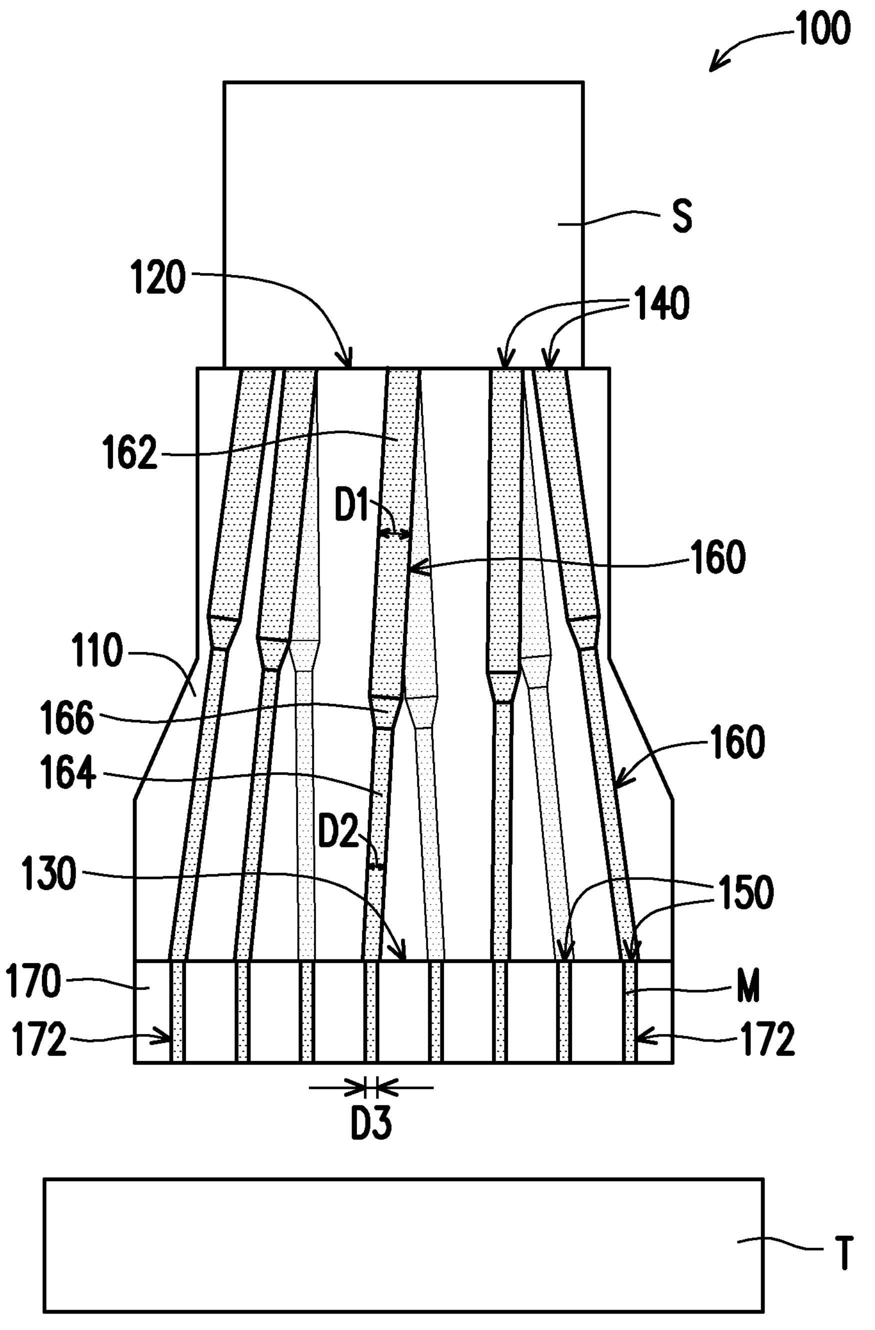
FIG. 1 is a side cross-sectional view of a coating nozzle according to an embodiment of the disclosure.

The disclosure provides a coating nozzle, which can enable the film thickness of a coated coating material to be even.

The coating nozzle of the disclosure, for coating a coating material supplied from a coating material supply portion on a coating object includes: a chamber portion, communicated with the coating material supply portion; a supply surface, disposed on a side of the chamber portion; a discharge surface, disposed on other side of the chamber portion opposite to the supply surface and used to discharge the coating material; multiple supply holes, annularly arranged on the supply surface with a first position as a center; multiple discharge holes, linearly arranged into at least one straight line on the discharge surface, wherein a number of the discharge holes corresponds to a number of the supply holes; and multiple communication hole paths, respectively and correspondingly communicated from the supply holes on the supply surface to the discharge holes on the discharge surface, wherein the communicating holes respectively have different lengths, the communicating holes include a large diameter portion and a small diameter portion whose diameter is shorter than a diameter of the large diameter portion, the small diameter portions in the communicating holes respectively have different diameters or lengths.

In an embodiment of the disclosure, a straight line extending in an arrangement direction of the discharge holes is used as a reference line, under a viewing angle orthogonal to a direction of the discharge surface, ones nearer to the first position on the supply surface among the discharge holes are communicated with ones away from the reference line among the supply holes.

In an embodiment of the disclosure, in the communication hole paths, the diameters of the small diameter portions are formed to be the same, and the lengths of the small diameter portions are formed to be different.

In an embodiment of the disclosure, in the communication hole paths, the diameters of the large diameter portions are formed to be the same, and the small diameter portions are disposed on a side of the discharge holes.

In an embodiment of the disclosure, the coating nozzle further includes a nozzle portion, opposite to the discharge surface and coating the coating material discharged from the discharge surface on the coating object through a coating flow path. The coating flow path is disposed inside the nozzle portion to be communicated with the discharge holes, the diameter of the small diameter portion is larger than a diameter of the coating flow path.

In an embodiment of the disclosure, a connecting portion is disposed between the large diameter portion and the small diameter portion, a diameter of the connecting portion is tapered from the large diameter portion to the small diameter portion.

Based on the above, in the coating nozzle of the disclosure, the supply holes and the discharge holes are respectively and correspondingly communicated through the communication hole paths, wherein the communication hole paths include the large diameter portion and the small diameter portion whose diameter is shorter than that of the large diameter portion, and the small diameter portions in the communication hole paths respectively have different diameters or lengths. In this way, the small diameter portions in the communication hole paths adopt appropriate diameters or lengths according to different positions, so that the pressure loss of the communication hole paths can be even, and the film thickness of the coating material can be kept even when being coated on the coating object. Accordingly, the coating nozzle of the disclosure can enable the film thickness of the coated coating material to be even.

Figure 2:
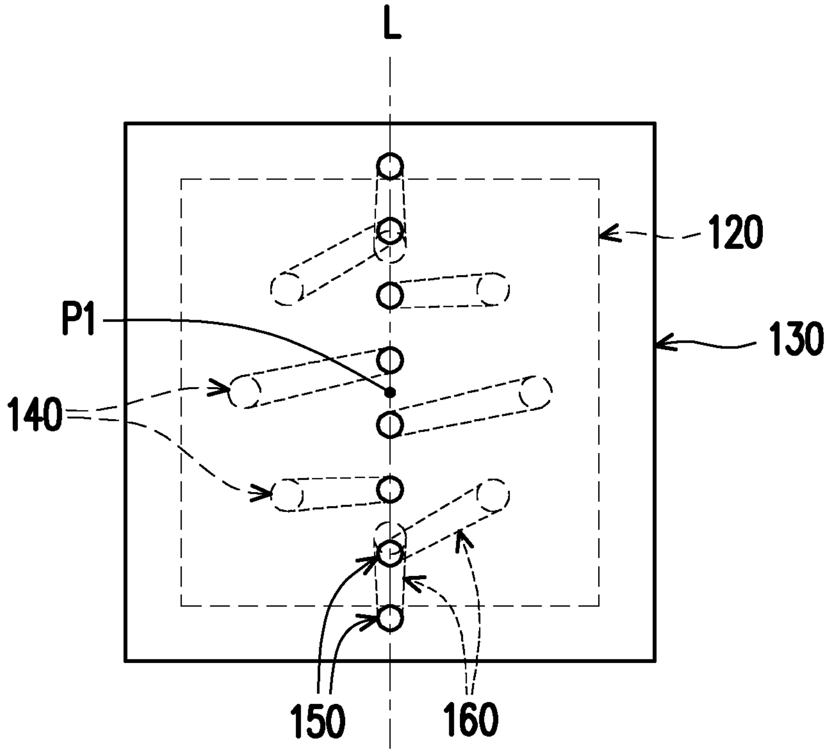
FIG. 2 is a bottom perspective view of a discharge surface of the coating nozzle of FIG. 1.

FIG. 1 is a side cross-sectional view of a coating nozzle according to an embodiment of the disclosure. FIG. 2 is a bottom perspective view of a discharge surface of the coating nozzle of FIG. 1. In the embodiment, a coating nozzle 100 is applied to coat a coating material M supplied by a coating material supply portion S on a vehicle body (not shown), but may also be applied to other coating objects that need to be coated, and the disclosure is not limited thereto. The specific structure of the coating nozzle 100 of the embodiment will be described below with reference to FIG. 1 and FIG. 2.

Please refer to FIG. 1 and FIG. 2. In the embodiment, the coating nozzle 100 coats the coating material M supplied from the coating material supply portion S on a coating object T. The coating nozzle 100 includes a chamber portion 110, a supply surface 120, a discharge surface 130, multiple supply holes 140, multiple discharge holes 150, and multiple communication hole paths 160. A side of the chamber portion 110 is connected to the coating material supply portion S. The supply surface 120 is disposed on a side of the chamber portion 110, that is, the side communicated with the coating material supply portion S, so as to receive the coating material M supplied by the coating material supply portion S. The discharge surface 130 is disposed on the other side of the chamber portion 110 opposite to the supply surface 120. Specifically, the discharge surface 130 is parallelly disposed on the other side of the chamber portion 110 opposite to the supply surface 120 and is used to discharge the coating material M. The supply holes 140 are annularly arranged on the supply surface 120 with a first position P1 as the center (as shown in FIG. 2), and the first position P1 is approximately located at the center position of the supply surface 120. The discharge holes 150 are linearly arranged into at least one straight line on the discharge surface 130 (as shown in FIG. 2, the discharge holes 150 are arranged into only one straight line in the embodiment, but in other unshown embodiments, the discharge holes 150 may also be arranged into multiple straight lines according to actual requirements). The side of the supply surface 120 of the chamber portion 110 is smaller than the side of the discharge surface 130 of the chamber portion 110, and the chamber portion 110 is formed in a shape that gradually widens from the side of the supply surface 120 to the side of the discharge surface 130, but the disclosure is not limited thereto. In addition, the number of the discharge holes 150 corresponds to the number of the supply holes 140, eight of which are shown in FIG. 1 of the embodiment, but the number may be adjusted according to actual conditions and is not limited to eight.

Furthermore, in the embodiment, the communication hole paths 160 are respectively communicated from the supply holes 140 on the supply surface 120 to the discharge holes 150 on the discharge surface 130. In other words, the communication hole paths 160 are independent from each other, and the supply holes 140 are communicated with the discharge holes 150 through the communication hole paths 160 in a one-to-one manner. The communication hole paths 160 respectively have different lengths, and the communication hole paths 160 include a large diameter portion 162 and a small diameter portion 164 whose diameter is shorter than that of the large diameter portion 162. In addition, the small diameter portions 164 of the communication hole paths 160 respectively have different diameters or lengths according to positions of connection.

It can be seen that in the coating nozzle 100 of the embodiment, the supply holes 140 and the discharge holes 150 are respectively and correspondingly communicated through the communication hole paths 160, wherein the communication hole paths 160 include the large diameter portion 162 and the smaller diameter portion 164 whose diameter is shorter than that of the large diameter portion 162, and the small diameter portions 164 in the communication hole paths 160 respectively have different diameters or lengths. In this way, the small diameter portions 164 in the communication hole paths 160 adopt appropriate diameters or lengths according to different positions, so that the pressure loss of the communication hole paths 160 can be even, and the film thickness of the coating material M can be kept even when being coated on the coating object T. Accordingly, the coating nozzle 100 can enable the film thickness of the coated coating material M to be even.

Please continue to refer to FIG. 1. In the embodiment, preferably, diameters D1 of the large diameter portions 162 in the communication hole paths 160 are formed to be the same, and the small diameter portions 164 are disposed on the side of the discharge holes 150; and diameters D2 of the small diameter portions 164 in the communication hole paths 160 are formed to be the same, and the lengths of the small diameter portions 164 are formed to be different. In this way, through forming the diameters D1 of the large diameter portions 162 to be the same and the diameters D2 of the small diameter portions 164 to be the same, the burden on processing can be reduced and mass production can be facilitated. The small diameter portions 164 are disposed on the side of the discharge holes 150, which can reduce the diameter change from the discharge holes 150, so as to suppress the speed change of the coating material M in a hole path, thereby reducing clogging of the coating material M in the hole path. In addition, the longer the length of the small diameter portion 164, the larger the pressure loss. Therefore, through lengthening the length of the small diameter portion 164 with shorter length in the communication hole path 160, and shortening the length of the small diameter portion 164 with longer length in the communication hole path 160, the pressure loss can be even. For example, the ones located nearer to the outside among the discharge holes 150 communicated on the discharge surface 130 are larger than the ones located nearer to the center among the discharge holes 150 communicated on the discharge surface 130. Thereby, the pressure losses of the discharge holes 150 can be even.

Furthermore, in the embodiment, a connecting portion 166 is disposed between the large diameter portion 162 and the small diameter portion 164 in the communication hole paths 160. The diameter of the connecting portion 166 is tapered from the large diameter portion 162 to the small diameter portion 164. Accordingly, the coating material M in the communication hole paths 160 can smoothly flow at where the diameter changes to prevent the coating material M from clogging in the communication hole paths 160.

In addition, the coating nozzle 100 further includes a nozzle portion 170, which is disposed on the same side opposite to the discharge surface 130, that is, disposed on the other side of the chamber portion 110 opposite to the coating material supply portion S. The nozzle portion 170 coats the coating material M discharged from the discharge surface 130 on the coating object T through a coating flow path 172. The coating flow path 172 is disposed inside the nozzle portion 170 to be communicated with the discharge holes 150, and the diameter D2 of the small diameter portion 164 is larger than a diameter D3 of the coating flow path 172. Thus, flowing from the larger diameter to the smaller diameter can reduce the clogging of the coating material M, so that the coating can be more even.

Please refer to FIG. 2 again. In the embodiment, a straight line L extending in the arrangement direction of the discharge holes 150 is used as a reference line. Under the viewing angle orthogonal to the direction of the discharge surface 130 (that is, the viewing angle of FIG. 2), the ones nearer to the first position P1 on the supply surface 120 among the discharge holes 150 are communicated with the ones away from the reference line L among the supply holes 140. With such a configuration, the lengths of the communication hole paths 160 can be made as equal as possible, so that the difference in pressure loss can be easily adjusted, and the film thickness of the coating material M can be even.

In summary, in the coating nozzle of the disclosure, the supply holes and the discharge holes are respectively and correspondingly communicated through the communication hole paths, wherein the communication hole paths include the large diameter portion and the small diameter portion whose diameter is shorter than that of the large diameter portion, and the small diameter portions in the communication hole paths respectively have different diameters or lengths. In this way, the small diameter portions in the communication hole paths adopt appropriate diameters or lengths according to different positions, so that the pressure loss of the communication hole paths can be even, and the film thickness of the coating material can be kept even when being coated on the coating object. Preferably, the diameters of the large diameter portions are formed to be the same and the diameters of the small diameter portions are formed to be the same, so that the burden on processing can be reduced and mass production can be facilitated. Moreover, the small diameter portions are disposed on the side of the discharge holes, which can reduce the diameter change between the communication hole paths and the discharge holes, so as to suppress the speed change of the coating material in the hole path, thereby reducing the clogging of the coating material in the hole path. In addition, for the lengths of the small diameter portions, the ones located nearer to the outside among the discharge holes communicated on the discharge surface are larger than the ones located nearer to the center among the discharge holes communicated on the discharge surface, so that the pressure loss of the discharge holes can be even. Accordingly, the coating nozzle of the disclosure can enable the film thickness of the coated coating material to be even.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:

1. A coating nozzle, for coating a coating material supplied from a coating material supply portion on a coating object, comprising:

a chamber portion, communicated with the coating material supply portion;

a supply surface, disposed on a side of the chamber portion;

a discharge surface, disposed on other side of the chamber portion opposite to the supply surface and used to discharge the coating material;

a plurality of supply holes, annularly arranged on the supply surface with a first position as a center;

a plurality of discharge holes, linearly arranged into at least one straight line on the discharge surface, wherein a number of the discharge holes corresponds to a number of the supply holes; and a plurality of communication hole paths, respectively and correspondingly communicated from the supply holes on the supply surface to the discharge holes on the discharge surface, wherein the communication hole paths respectively have different lengths, the communication hole paths comprise a large diameter portion and a small diameter portion whose diameter is shorter than a diameter of the large diameter portion, the small diameter portions of the communication hole paths respectively have different diameters or lengths, and the lengths of the small diameter portions of the ones located nearer to outside among the discharge holes communicated on the discharge surface are larger than the lengths of the small diameter portions of the ones located nearer to center among the discharge holes communicated on the discharge surface.

2. The coating nozzle according to claim 1, wherein:

a straight line extending in an arrangement direction of the discharge holes is used as a reference line, under a viewing angle orthogonal to a direction of the discharge surface, ones nearer to the first position on the supply surface among the discharge holes are communicated with ones away from the reference line among the supply holes.

3. The coating nozzle according to claim 2, wherein:

in the communication hole paths, the diameters of the small diameter portions are formed to be the same.

4. The coating nozzle according to claim 2, wherein:

in the communication hole paths, the diameters of the large diameter portions are formed to be the same, and the small diameter portions are disposed on a side of the discharge holes.

5. The coating nozzle according to claim 4, further comprising:

a nozzle portion, opposite to the discharge surface and coating the coating material discharged from the discharge surface on the coating object through a coating flow path, wherein the coating flow path is disposed inside the nozzle portion to be communicated with the discharge holes, the diameter of the small diameter portion is larger than a diameter of the coating flow path.

6. The coating nozzle according to claim 4, wherein:

a connecting portion is disposed between the large diameter portion and the small diameter portion, a diameter of the connecting portion is tapered from the large diameter portion to the small diameter portion.

7. The coating nozzle according to claim 1, wherein:

in the communication hole paths, the diameters of the small diameter portions are formed to be the same.

8. The coating nozzle according to claim 1, wherein:

in the communication hole paths, the diameters of the large diameter portions are formed to be the same, and the small diameter portions are disposed on a side of the discharge holes.

9. The coating nozzle according to claim 8, further comprising:

a nozzle portion, opposite to the discharge surface and coating the coating material discharged from the discharge surface on the coating object through a coating flow path, wherein the coating flow path is disposed inside the nozzle portion to be communicated with the discharge holes, the diameter of the small diameter portion is larger than a diameter of the coating flow path.

10. The coating nozzle according to claim 8, wherein:

a connecting portion is disposed between the large diameter portion and the small diameter portion, a diameter of the connecting portion is tapered from the large diameter portion to the small diameter portion.

* * * * *